April 14, 1964 J. E. CHILDS 3,128,557
REMOTE BIN LEVEL-INDICATING DEVICE
Filed April 17, 1961 4 Sheets-Sheet 1

INVENTOR.
John E. Childs
BY Dorrs, McDougall,
Williams and Hersh
Attys

April 14, 1964    J. E. CHILDS    3,128,557
REMOTE BIN LEVEL-INDICATING DEVICE
Filed April 17, 1961    4 Sheets-Sheet 2

INVENTOR.
John E. Childs
BY Coone, McDougall,
Williams and Hersh
Att'ys

April 14, 1964  J. E. CHILDS  3,128,557
REMOTE BIN LEVEL-INDICATING DEVICE
Filed April 17, 1961  4 Sheets-Sheet 3

INVENTOR.
John E. Childs
BY Ooms, McDougall,
Williams and Hersh
Attys

INVENTOR.
John E. Childs

United States Patent Office 3,128,557
Patented Apr. 14, 1964

3,128,557
REMOTE BIN LEVEL-INDICATING DEVICE
John E. Childs, Boone, Iowa, assignor to Rolfes Electronics Corporation, Boone, Iowa, a corporation of Iowa
Filed Apr. 17, 1961, Ser. No. 103,639
7 Claims. (Cl. 33—126.6)

This invention relates to an apparatus designed to detect and record the level of material stored within a bin. The invention relates more particularly to a remote bin level indicating device which can automatically and with great accuracy measure the amount of material within a storage bin holding grain and like materials.

Storage bins for grain and like materials are usually provided in groups of several bins and are constantly being loaded and emptied, and it is naturally desirable to have a bin level detector and recorder for each bin. Present detectors have several noteworthy disadvantages, among them being the inability to give quick accurate readings under varying conditions. Present devices ordinarily include a weight or the like which is lowered into a bin and a recording or indicating system makes readings or gives signals corresponding to the extent of movement of the weight. These devices have been found to have unreliable mechanical systems which are slow and complicated in operation and which do not react accurately when the weight encounters material in the bins.

The now available bin level detecting units are also lacking in that they are not adapted to record and store the information for a suitable period of time. This feature is desirable where it is impractical to manually record individual readings of a plurality of bins in a short period of time. The present devices are further not readily feasible in connection with remote control actuating and recording stations and are not efficiently adaptable for use in connection with a master recording and controlling console from which a complete inventory of several bins can be accomplished.

It is therefore an object of this invention to provide a remote bin level indicating device which can automatically and with great accuracy measure the amount of materials such as grain or the like within a storage bin.

It is an additional object of this invention to provide a bin level indicating device which is adaptable for use in connection with groups of several bins which are constantly being loaded and emptied.

It is a further object of this invention to provide a bin level indicating device of the type employing a weight or the like which is lowered into a bin and which will enable transmission of signals upon detecting presence of material stored within the bin.

It is an additional object of this invention to provide a bin level indicating device which is adapted to store the detected information for a suitable period of time and which is feasible for use in connection with remote control actuating and recording stations.

These and other objects of this invention will appear hereinafter and for purposes of illustration, but not of limitation, specific embodiments of this invention are shown in the accompanying drawings, in which—

The present invention generally relates to a bin level indicator adapted to detect the level of material stored within a bin and to transmit the detected information to recording devices. The apparatus of this invention comprises a motor, a tape reel driven by the motor, and a tape with a weight attached adapted to pass into the bin containing the stored material. Upon detection by the weight of the stored material, the recording device which is associated with the tape reel is adapted to record and store the depth information. The driving means for the tape reel preferably include a torque sensor associated with the reel which provides for reversing of the driving motor and for shutting off of the motor in response to changes of torque resulting during the detecting cycle.

Figure 1:
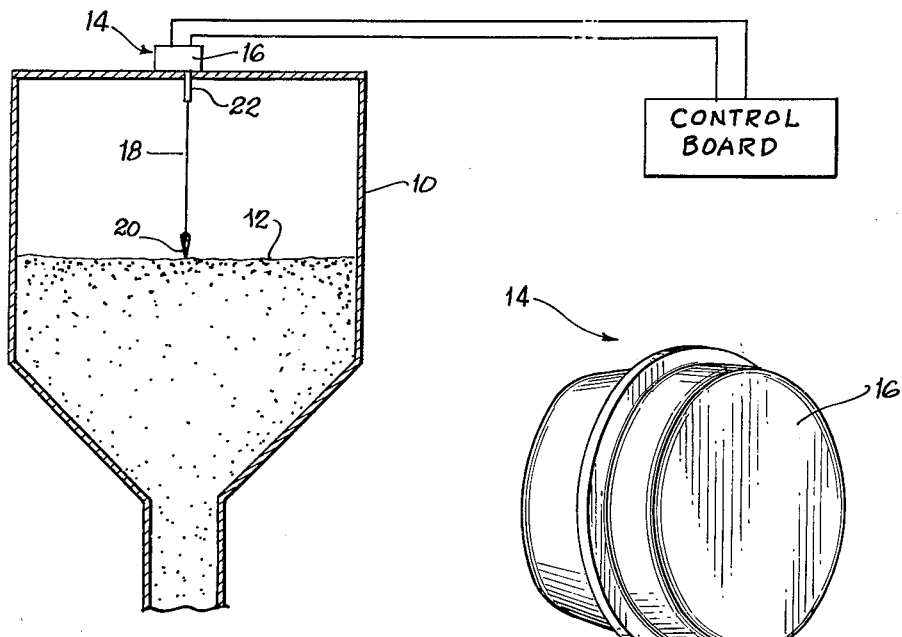
FIGURE 1 is a sectional view of a storage bin provided with a bin level detector having the characteristics of this invention.
Figure 2:
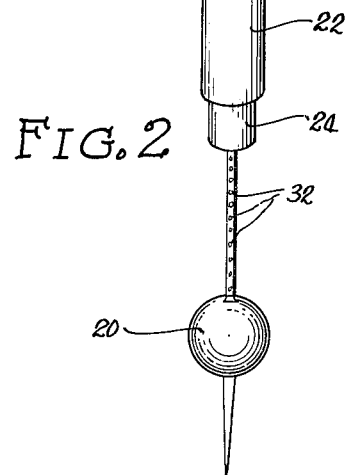
FIGURE 2 is a perspective view of the bin level detector which comprises the present invention.

A more detailed description of the invention is provided when considering the accompanying drawings. In FIGURES 1 and 2, there is shown a storage bin 10 filled to a certain level with grain 12 and provided with a bin level detector generally designated by the numeral 14. The bin level detector is comprised of a housing 16 out of which extends a tape 18 with a weight 20 suspended thereon. Hollow cylindrical members 22 and 24 comprise a neck portion extending from the housing 16. The cylindrical members have associated therewith many of the novel components of this invention, as will hereinafter become apparent.

Figure 3:
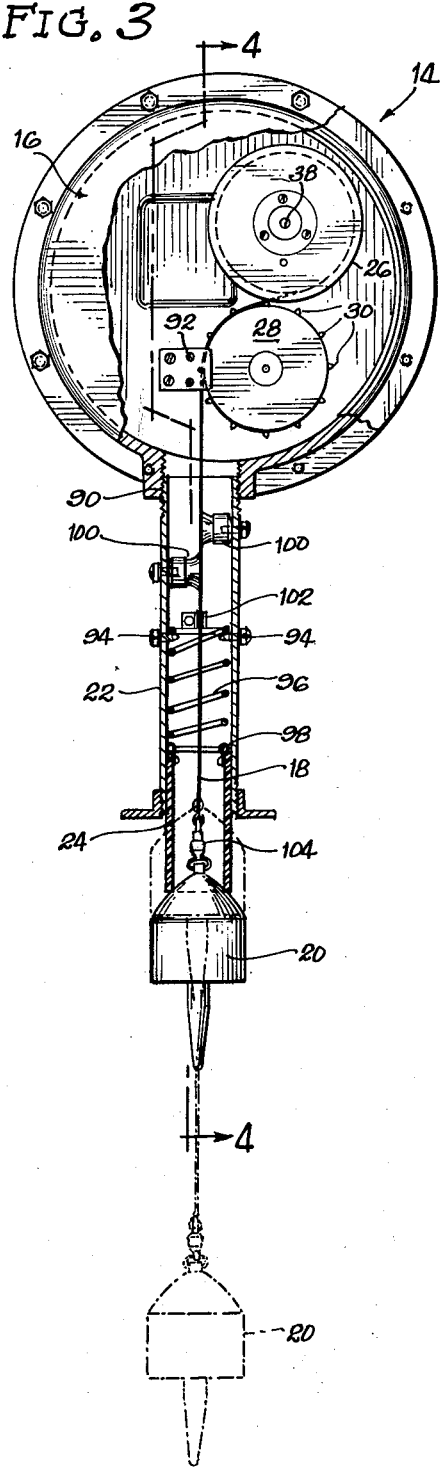
FIGURE 3 is a front elevation view partly in section of the bin level detector of this invention.
Figure 4:
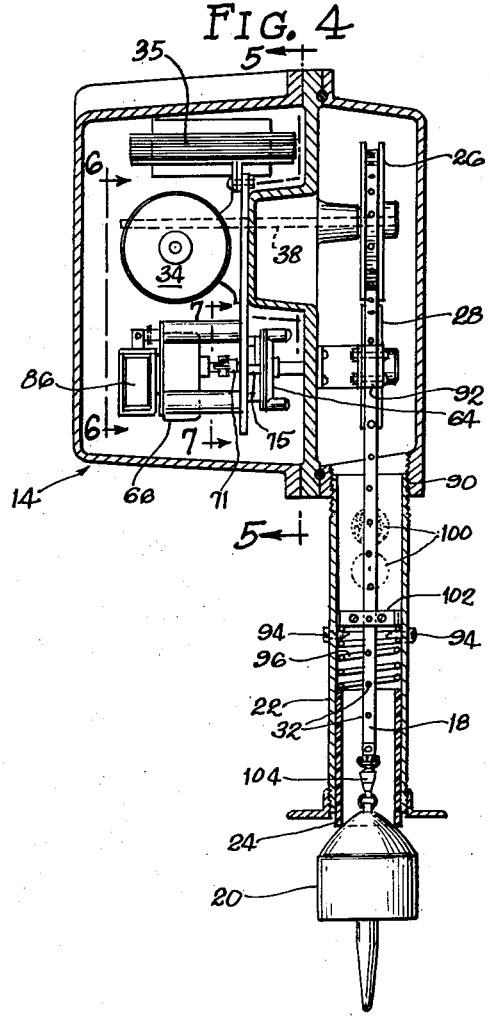
FIGURE 4 is a sectional view taken about the line 4—4 of FIGURE 3.

FIGURES 3 and 4 illustrate the internal mechanical and electrical components of the apparatus representing a specific embodiment of this invention. There is provided within the housing 16 a reel 26 upon which the tape 18 is adapted to be wound. A sprocket 28 having stubs 30 is provided on an axis beneath the reel 26 and the tape passes over this sprocket. The tape is provided with perforations 32 which receive the stubs 30, this arrangement providing for positive correlation between the extent of the tape unwound or wound and the rotation of the reel and sprocket.

Figure 5:
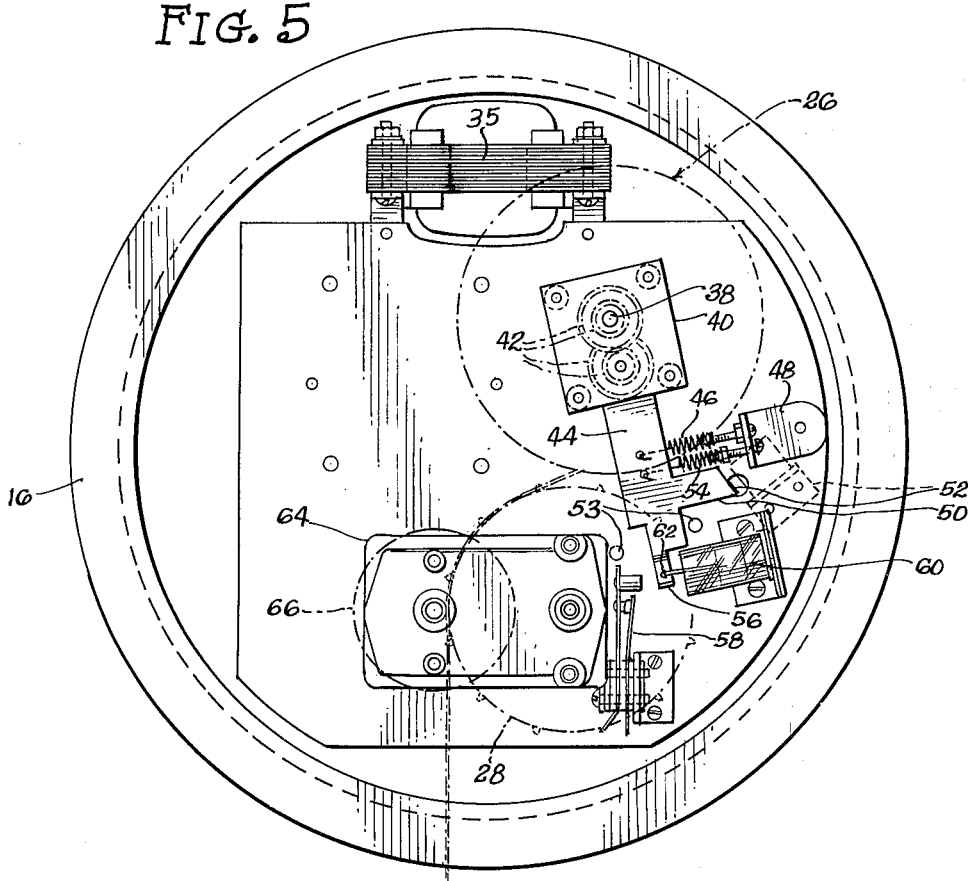
FIGURE 5 is an enlarged sectional view taken about the line 5—5 of FIGURE 4.
Figure 6:
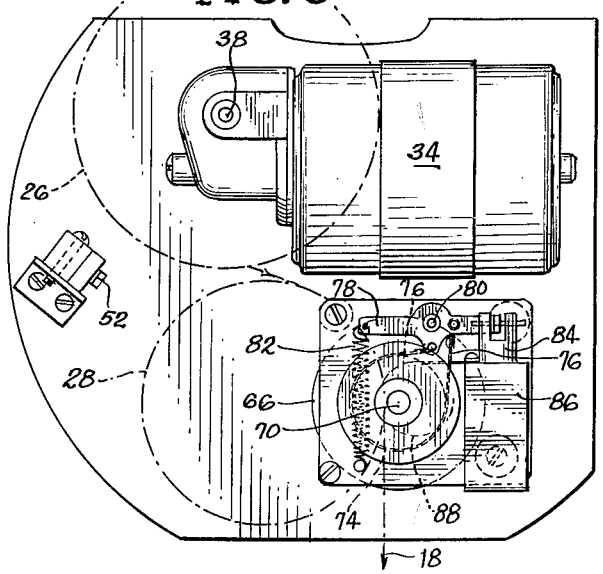
FIGURE 6 is an enlarged sectional view taken about the line 6—6 of FIGURE 4.
Figure 7:
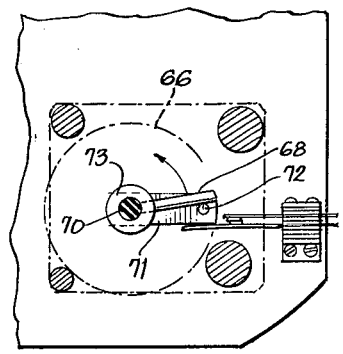
FIGURE 7 is an enlarged sectional view taken about the line 7—7 of FIGURE 4.

A worm drive motor 34 is provided to drive the reel 26 around the shaft connected to the reel. On the drive spindle 38 of the motor, there is provided a gear reduction cage 40 adapted to swivel about the drive spindle (see FIGURE 5). The gears 42 comprise two pairs each with a 2 to 1 ratio providing a combined speed reduction of 4 to 1. Connected to the cage is an arm 44 adapted to move as the cage swivels. A filter choke 35 is adapted to oppose rapid changes in current flow, thus preventing arcing at the motor brushes when the motor is reversed.

It will be apparent from the drawings that the torque induced by means of the weight 20 on the reel 26 will cause swivelling of the arm 44 to the left. The swivelling caused by the torque on the reel will be in opposition to the tension spring 46 secured to the arm 44 and, by means of the bracket 48, to the housing 16. When the weight 20 is not exerting torque on the reel, as when the weight is at rest on the material within the bin, then the spring 46 is adapted to normally hold the arm 44 in a right-hand position. This right-hand position of the arm enables the projection 50 formed on the arm 44 to hold open normally closed switch 52. Stops 53 are provided to otherwise confine the movement of the arm 44.

A second tension spring 54 is loosely secured to the bracket 48 and to the arm 44. This spring does not normally urge the arm when there is no torque exerted on the reel. The spring only comes into play when excessive torque is exerted on the arm and it is swivelled to an extreme left-hand position. This excessive torque results when the weight 20 is raised after striking material in the bin and ultimately strikes the cylinders 24 and 22. The stopping effect of these cylinders will exert a large torque on the reel 26 which causes the arm 44 to swivel to the extreme left. In this position, the portion 56 on the arm will hold the normally closed switch 58 in the open position.

A dash pot 60 is preferably secured to the arm 44 as at 62 to impede rapid movements of the arm as torque changes develop. This will avoid spurious opening and closing of the switches dependent on the movement of the arm 44 which may be occasioned by bumping of the detector or other vibrations of the apparatus.

The recording mechanism of the invention shown in FIGURES 5 through 8 is operatively connected to the sprocket 28 through a gear reduction unit 64. The recording unit comprises a potentiometer 66 operated through a shaft 70 which has a sleeve 73 secured thereto. The sleeve 73 has a pin 68 fitted therein which is adapted to abut the pin 72 formed on the arm 71. Arm 71 is secured to the shaft 75 (FIGURE 4) which is directly connected to the gear reduction unit 64.

A brake 74 (FIGURE 6) is fixed to the shaft 70 and associated therewith is a brake strap 76 made operative with respect to the brake by means of the action of the stamping 78. Stamping 78 is pivoted on a stationary mounting at 80 and has a tension spring 82 fixed at one end and a solenoid plunger 84 fixed to the other end. Energizing of the solenoid 86 causes the plunger 84 to pivot the stamping in opposition to the tension springs 82. This loosens the strap 76 and releases the brake 74. A spiral spring 88 is also secured to the shaft 70 and is adapted normally to rotate the shaft and pin 68 to the position shown in FIGURE 7. This is the zero position of the potentiometer and is the position at which a depth measurement is begun.

Extending from the housing 16 there are provided two cylinders 22 and 24 (FIGURE 3) which include many of the novel features of this invention. The first hollow cylinder is secured to the housing 16 at 90 and provides a direct passage for the tape from the tape guide 92 adjacent the sprocket 28 to within the bin. Intermediate the ends of the cylinder 22 there are provided two screws 94 to which is secured one end of a compression spring 96. The second cylinder 24 is provided with means at 98 for securing the other end of the spring.

Brushes 100 are provided within the cylinder 22 and are adapted to clean the tape as it passes through the cylinder. This will effectively prevent the carrying of foreign matter by the tape into the housing 16. A second tape guide 102 is also desirably provided within the cylinder 22.

The cylinders 22 and 24 are shown in FIGURE 3 in a position wherein the weight 20 is not exerting substantial force on the cylinder 24. Thus, the cylinder 24 projects a substantial distance beyond the end of the cylinder 22 due to the action of the spring 96. When the tape reel 26 is pulling the tape up, the cylinder 24 will assume the position shown in FIGURE 4, since the force of the motor driving the reel will be sufficient to overcome the resistance of the spring 96. It will be apparent that in the position shown in FIGURE 4, the weight 20 fitted within the cylinder 24 forms an effective seal preventing ingress of foreign material into the housing 16. It will also be apparent that the effect of the spring loaded cylinder is to provide a cushion for the weight as it is drawn up by the tape reel.

In order to prevent twisting of the tape 18 due to the spinning of the weight which might occur, a swivel 104 is provided between the tape and the weight.

Figure 8:
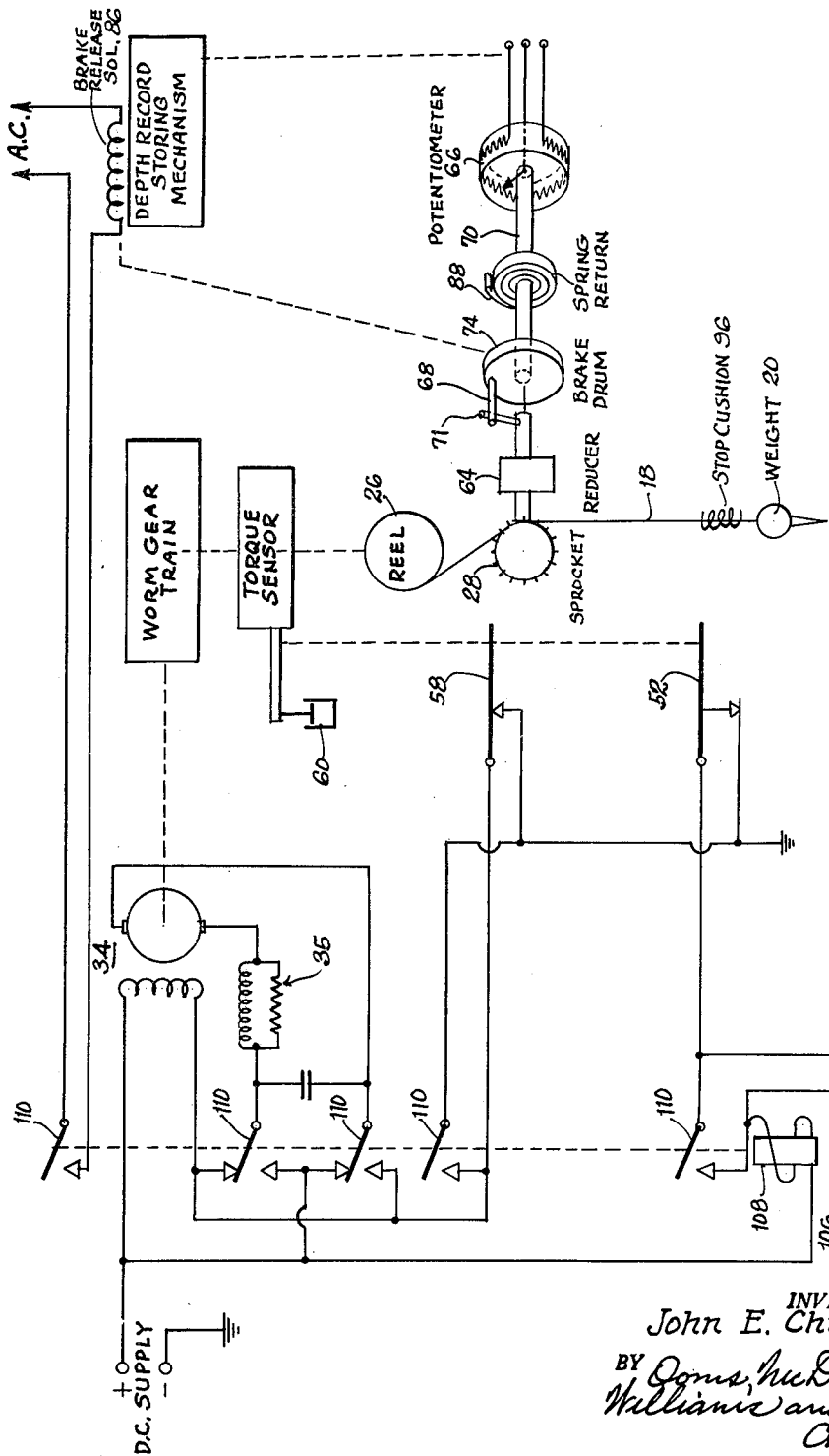
FIGURE 8 is a schematic illustration of the electrical circuitry and mechanical components comprising the present invention.

The operation of this device will now be described with reference to FIGURE 8. To begin a detecting and recording cycle, push button 106 is operated which is followed by the operation of relay 108 and the brake release coil or solenoid 86. The operation of relay 108 starts the motor 34 and drives the reel 26 in a clockwise direction and unwinds and lowers the tape 18. Simultaneously, the operation of the solenoid 86 releases the brake 74 and, due to the action of the spring return 88, the pin 68 on the shaft 70 is returned to the zero position shown in FIGURE 7.

The torque exerted causes the arm 44 to assume a position intermediate the stops 53 in opposition to the tension in spring 46. As the tape is lowered, the pin 68, and accordingly, the wiper arm of the potentiometer 66, rotate due to the rotation of the sprocket 28 and will continue to do so until the weight reaches an obstruction. When this occurs, the torque exerted on the reel 26 by the weight is eliminated and the spring 46 causes the arm 44 to swivel to the right. This causes the projection 50 on the arm 44 to open the switch 52. The opening of the switch 52 breaks the holding circuit shown in FIGURE 8, and relay 108 is de-energized along with the solenoid 86. Since the switch 58 is normally closed, and since de-energization of the relay 108 moves contact arms 110 to the position shown in FIGURE 8, the polarity to the field winding of the motor 34 will be reversed, and the weight will begin to rise.

De-energization of the solenoid 86 causes the brake 74 to become operative since the strap 76 will be tightened around the brake due to the action of spring 82. Therefore, the shaft 70 will not turn when rotation of the sprocket wheel causes arm 71 to return to the position shown in FIGURE 7. In other words, the pin 68 will not follow the arm 71 to the zero position shown in FIGURE 7, but will remain at the point reached when the weight touched the material in the bin.

The tape will be rolled up until the weight is stopped by the cylinders 22 and 24. There will, of course, be a substantial torque exerted on the reel at this time, and this will cause the arm 44 to swivel to the extreme left and open the switch 58. As is apparent from considering FIGURE 8, opening of the switch 58 will shut off the motor, but the reading for that cycle will be retained until a subsequent cycle is begun.

The remote bin level detector of this invention is adaptable for use in connection with continuous detecting and recording mechanisms. This can be accomplished by placing a timer such that it will operate the push button 106 at desired intervals. The inventive device is adaptable for use as a detecting unit for a single bin, and it is also feasible in connection with the taking of a complete inventory of a plurality of bins. In this latter connection, the units described can be associated with each individual bin. The master console can be provided with push buttons or switches corresponding to the separate bins, and an automatic recorder can be adapted to store the information as each bin is checked.

The devices of this invention are also feasible in connection with the control of material levels during loading and unloading of one or more bins. Here, the timer could be provided, which would enable periodic detection of the changing levels and provide for shutting off of the loading or unloading mechanisms when a desired level is reached.

The device of this invention of course provides for determination of bin levels in an indirect fashion, since the travel of the weight will correspond to the amount of the extent of the bin which is not loaded with material. It will be apparent, however, that the information which is provided can be readily converted to direct readings, either manually or automatically, in various well-known fashions.

It is apparent that there has been described a remote bin level detecting device with many distinct advantages. The device can be provided with a cast aluminum housing to facilitate the handling of the device and it can be mounted either inside or outside of a storage bin. The perforated tape employed provides a positive mechanical linkage with the sprocket wheel, and therefore, enables reliable readings by the recording apparatus. The tape is preferably formed of stainless steel, which avoids occurrence of sparking, if it is rubbed against the walls of the bin.

The combination of the dusting brushes which may be formed of goat hair, and the seal formed by the weight and the cylinder 24 provides a dust-proof mechanism. This is extremely important from a maintenance standpoint. The use of a torque sensor of the type described permits all of the switching to be accomplished inside an explosion-proof and dust-proof casing.

It will be understood that various modifications may be made in the above disclosed bin level detecting system which provide the characteristics of this invention without departing from the spirit thereof, particularly as defined in the following claims.

I claim:

1. In a storage bin provided with means for periodically removing and introducing material whereby the level of material within said bin is constantly changing, the improvement comprising level detector means connected to the top of said bin, said detector means including a housing, a tape reel located within said housing, a motor for driving said reel and a tape adapted to be played out from or wound onto said reel depending on the direction of operation of said motor, a weight secured to the end of said tape, means for actuating said motor whereby said tape can be played out and said weight lowered into said bin, a wheel disposed adjacent said reel within said housing and adapted to be rotated by said tape, means associated with said wheel for recording the extent of movement of said weight and being adapted to retain a reading corresponding to said movement when said weight strikes the material within said bin, means for reversing said motor when said weight strikes the material stored in said bin whereby said tape is adapted to be wound onto said reel, said housing being provided with an elongated cylindrical means having one end secured to the housing with the other end extending toward said bin, an axis of said cylindrical means being disposed generally in the same plane as said tape reel, said cylindrical means comprising first and second cylinders with said second cylinder being slidably received within said first cylinder, spring means having one end fastened intermediate the ends of said first cylinder and the other end attached to said second cylinder, said second cylinder normally projecting substantially beyond the end of said first cylinder through the action of said spring means and being adapted to be forced into said first cylinder in opposition to said spring means, said weight having a diameter greater than the diameter of said second cylinder whereby said weight will be forced against said second cylinder as said tape is wound onto said reel.

2. In a storage bin provided with means for periodically removing and introducing a material, whereby the level of material within said bin is constantly changing, the improvement comprising level detector means connected to the top of said bin, said detector means including a housing, a tape reel located within said housing along with a motor for driving said reel and a tape adapted to be played out from said reel or wound onto said reel depending on the direction of operation of said motor, a weight secured to the end of said tape, a movably mounted switch actuating means disposed within said housing and operatively connected to said tape, and spring means connected to said switch actuating means, said spring means being adapted to oppose the force exerted on said switch actuating means by said tape, means for actuating said motor whereby said tape can be played out and said weight lowered into said bin, the force exerted by said tape as said weight moves freely in said bin causing said switch actuating means to assume an intermediate position, means associated with said reel for recording the extent of movement of said weight and adapted to retain the reading present thereon when said weight strikes the material within said bin, a reversing switch for said motor, said switch actuating means being adapted to actuate said reversing switch in response to the action of said spring means when said weight strikes the material in said bin thereby relieving the force exerted by said tape, and a shutoff switch for said motor, said switch actuating means moving to actuate said shutoff switch when the force exerted by said tape increases upon engagement of said weight with said housing when said weight is moved to its upper position.

3. A storage bin in accordance with claim 2 wherein said housing is provided with an elongated cylindrical means having one end secured to said housing with the other end extending within said bin, the axis of said cylindrical means being disposed generally in the same plane as said tape reel, and wherein said weight has a diameter greater than said cylindrical means, whereby the extending end of said cylindrical means provides an effective stop for said weight as said tape is wound onto said reel, engagement of said weight with said cylindrical means resulting in the increase of force exerted by said tape to cause said switch actuating means to shut off said motor.

4. In a storage bin provided with means for periodically removing and introducing material, whereby the level of material within said bin is constantly changing, the improvement comprising level detector means connected to the top of said bin, said detector means including a housing, an elongated cylindrical means having one end secured to said housing with the other end extending within said bin, a tape reel located within said housing along with a motor for driving said wheel and a tape adapted to be played out from said reel or wound onto said reel depending on the direction of operation of said motor, the axis of said cylindrical means being disposed generally in the same plane as said tape reel whereby said tape is adapted to be fed through said cylindrical means into said bin, a weight secured to the end of said tape, means for actuating said motor whereby said tape can be played out and said weight can be lowered into said bin, means associated with said reel for recording the extent of movement of said weight and adapted to retain the reading present thereon when said weight strikes the material within said bin, means including a torque sensor associated with said reel for reversing said motor due to the reduction in torque exerted by said weight when it strikes the material stored in said bin whereby said tape can be wound onto said reel, and wherein said weight has a diameter greater than said cylindrical means whereby the extending end of said cylindrical means provides an effective stop for said weight as said tape is wound onto said reel, said torque sensor being adapted to sense the increase in torque occasioned by the stopping of said weight and to shut off said motor when said increase is sensed.

5. A storage bin in accordance with claim 4 including a sprocket wheel disposed adjacent said reel and wherein said tape is perforated, the perforations in said tape being adapted to interfit with the sprockets on said wheel, said means for recording the extent of movement of said weight including a shaft connected to said sprocket wheel adapted to be rotated in response to the movement of said tape as it is played out from said reel, a potentiometer connected to said shaft adapted to change its resistance as said shaft rotates, a braking means on said shaft adapted to hold said potentiometer at the resistance reading recorded when said weight strikes the material stored in the bin and a spring return means on said shaft adapted to return said potentiometer to a zero reading when said brake means is released.

6. A storage bin according to claim 4 wherein said cylindrical means comprises first and second telescoping cylinders, means securing the second cylinder within the first cylinder adapted to resiliently urge said second cylinder downwardly whereby it extends beyond the end of said first cylinder and provides said stop.

7. A storage bin according to claim 6, wherein means for cleaning said tape are provided within said first cylinder, whereby entry of foreign matter into said housing is effectively prevented.

References Cited in the file of this patent

UNITED STATES PATENTS

| | | |
|---|---|---|
| 1,402,086 | Neale | Jan. 3, 1922 |
| 1,611,407 | Berg | Dec. 21, 1926 |
| 1,651,956 | Krammer | Dec. 6, 1927 |
| 1,760,609 | Rowan et al. | May 27, 1930 |
| 1,947,260 | Hall et al. | Feb. 13, 1934 |
| 2,899,751 | Mayes | Aug. 18, 1959 |
| 2,968,753 | Mesh | Jan. 17, 1961 |
| 3,017,771 | Bonhomme | Jan. 23, 1962 |
| 3,081,547 | Yosnall | Mar. 19, 1963 |

FOREIGN PATENTS

| | | |
|---|---|---|
| 213,305 | Germany | Sept. 25, 1909 |
| 560,829 | Germany | Oct. 7, 1932 |
| 910,426 | France | Jan. 28, 1946 |